Aug. 28, 1951     G. I. DANLY ET AL     2,565,759
FLYWHEEL BEARING DEMOUNTING ASSEMBLY
Filed Sept. 29, 1949
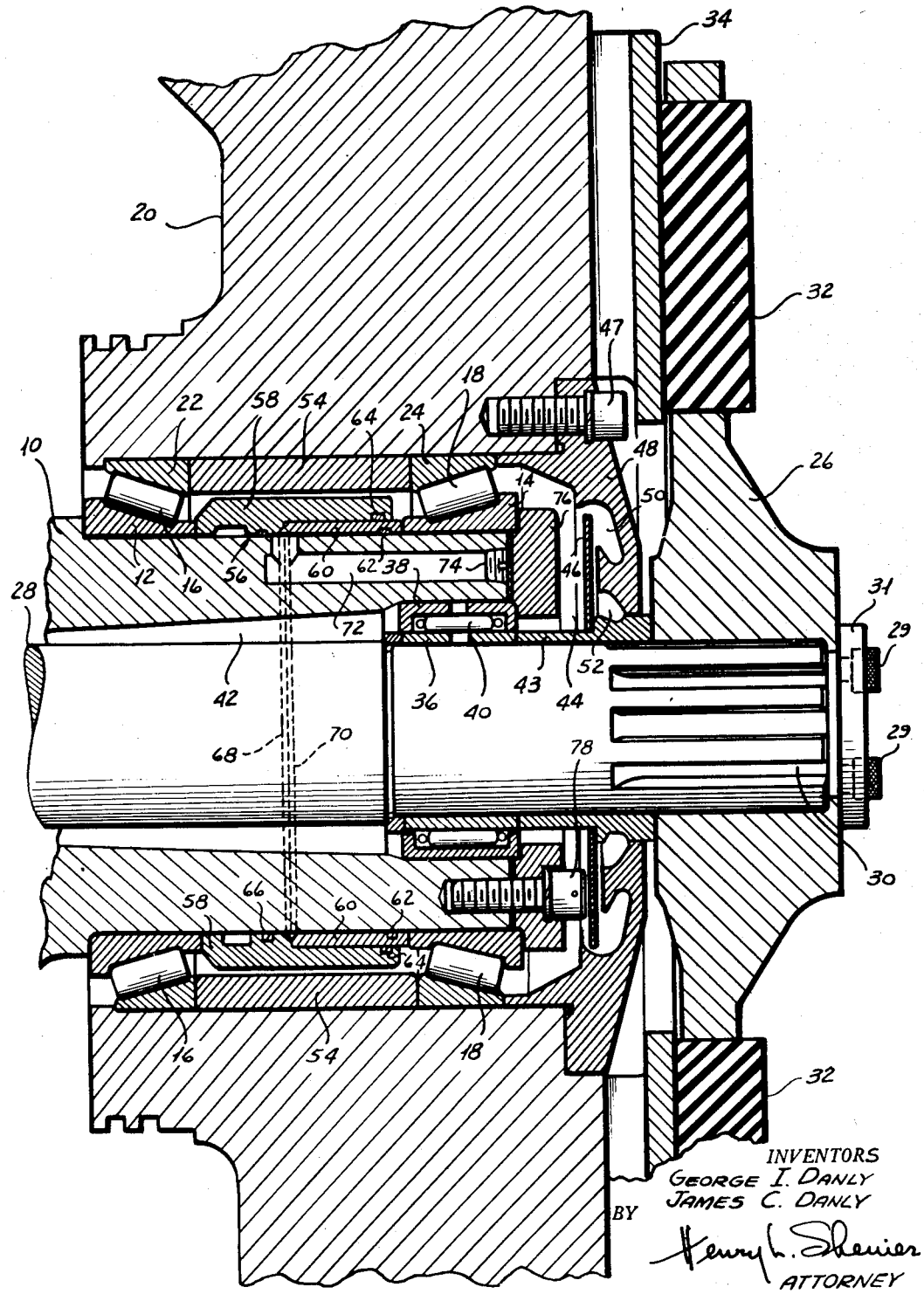
INVENTORS
GEORGE I. DANLY
JAMES C. DANLY
BY
Henry L. Shevier
ATTORNEY Patented Aug. 28, 1951

2,565,759

UNITED STATES PATENT OFFICE 2,565,759

FLYWHEEL BEARING DEMOUNTING ASSEMBLY

George I. Danly, Elmhurst, and James C. Danly, River Forest, Ill., assignors to Danly Machine Specialties, Inc., Chicago, Ill., a corporation of Illinois Application September 29, 1949, Serial No. 118,568

16 Claims. (Cl. 308—207)

Our invention relates to a flywheel bearing demounting assembly for power presses, and more particularly to a simple, convenient and expeditious means for demounting or removing the flywheel from a power press for the purpose of inspecting or replacing the flywheel bearing or for demounting the press for shipment.

Power presses are very large and heavy pieces of machinery employing heavy flywheels which are constantly driven by a prime mover. The flywheel stores the energy for the working motion of the press which occupies a small fraction of a complete cycle of press operations. At intervals it becomes necessary to inspect or replace flywheel bearings and great difficulty is encountered in the conventional construction in removing flywheels from the bearing shafts.

One object of our invention is to provide a flywheel bearing demounting assembly so constructed that the flywheel may be readily removed from its bearing in a simple, convenient, expeditious and certain manner.

Another object of our invention is to provide a flywheel bearing containing a built-in demounting assembly which does not require additional space, which is inexpensive to construct and easy to operate.

Other and further objects of our invention will appear from the following description.

The accompanying drawing which forms part of the instant specification and which is to be read in conjunction therewith is a sectional elevation of a flywheel bearing showing one embodiment of our invention.

In general our invention contemplates the provision of a flywheel bearing having a pair of inner races carried by a quill or the like cooperating with rollers and a pair of outer races. The inner races are normally held in separated position by means of nested members which together form the spacer ring for the inner races. Means are provided giving access to the junction of the nested members so that hydraulic pressure may be applied to force the nested members to extend to free the inner race positioned outboard of the bearing. The arrangement is such that when it is desired to remove the flywheel hydraulic pressure is applied forcing the outboard inner race free from its mounting to which it is normally secured with a snug fit to prevent relative motion between the inner race and its mounting. Once the outboard inner race is free the flywheel can be removed readily without any difficulty.

Referring now to the drawing, a quill 10 is carried by the press frame (not shown) in any suitable manner and supports a pair of inner races 12 and 14 upon which bearing rollers 16 and 18 are adapted to ride. The flywheel 20 is carried for rotation upon the bearing rollers 16 and 18 through a pair of outer races 22 and 24 and is driven in any suitable manner, such as through a prime mover and V-belts coacting with the periphery of the flywheel (not shown). The flywheel is adapted to be clutched to a clutch disk 26 which is secured to the shaft 28 of the press by means of splines 30. Friction blocks 32 are carried by the clutch disk 26 for coaction with the stationary clutch plate 34 and a movable clutch plate (not shown) between which and the stationary clutch plate the friction blocks 32 are adapted to be clamped to couple the flywheel 20 with the shaft 28. The shaft 28 is provided with a bearing comprising an inner race 36, an outer race 38 carried by the quill, and bearing rollers 40. Lubricant is supplied to both the shaft bearing and the flywheel bearing through the space 42 between the shaft 28 and the quill and is adapted to flow past the shaft bearing into the space 44 whence it is flung outwardly by a flinger ring 46 for a passage to the flywheel bearing members. Adjacent the finger ring we provide a member 48 provided with drain channels 50 and 52 for removing lubricant passing by the flinger ring and preventing it from leaking out the clutch surfaces.

The outer races 22 and 24 are separated by a ring 54 which positions these races. The inner races 12 and 14 are held in position by a composite separator indicated generally by the reference numeral 56. This separator comprises a pair of nesting members 58 and 60 which are normally in the telescoped position shown in the drawing. An oil sealing ring 62, or similar packing, seals the quill surface and the inner side of member 60. A packing ring 64 is adapted to seal the inner surface of the outer telescoping member 58 against the outer surface of the inner telescoping member 60. A packing ring 66 is adapted to seal the outer telescoping member 58 and the quill surface. The abutting edges of the members 58 and 60 are formed with beveled portions 68 and 70 which together form an annular groove giving access to the space between the nested members 58 and 60. Member 58 may be considered as an annular cylinder and member 60 may be considered as an annular piston. The groove provides communication to the piston 60 within the cylinder 58. The quill 10 is formed with a bore 72 communicating with the groove formed by the beveled edges 68 and 70, that is to say that the bore 72 communicates with the top of the piston 60. The bore 72 is normally closed by a plug 74. The outboard inner race 14 is normally held in position by a securing ring 76 fastened to the quill 10 by means of bolts 78. The ring 76 also maintains the outer race 38 of the shaft bearing in place.

It will be noted that the races with which the bearing rollers 16 and 18 coact are inclined so that the roller bearings act as a bearing for the rotation of the flywheel and at once as thrust bearings preventing lateral movement of the flywheel 20 axially of its axis of rotation. The construction is such that as long as outboard inner race 14 is in position the flywheel cannot be moved axially of its bearing to the right. The quill 10 is formed with a step portion forming an inboard seat for the inner race 12.

When it is desired to inspect or replace the flywheel bearing or to remove the flywheel for any reason, the clutch housing carrying the movable clutch plate (not shown) is removed to bring the parts to the position shown in the drawing. The bolts 29 which secure the plate 31 holding the clutch disk 26 on the shaft 28 are then removed. The clutch disk 26 is then removed. The bolts 47 holding the member 48 to the flywheel are then removed giving access to the flinger ring 46 which is easily removed from the shaft along with its sleeve 43 on which it is mounted. The bolts 78 are then removed so that the ring 76 can be removed. It will be found in our construction that the flywheel cannot be removed by sliding it to the right due to the fact that the inner race 14 is secured with a snug fit in order to preclude any movement between the race 14 and the quill 10. Ordinarily it has been an exceedingly difficult task to remove the heavy flywheel. The quill 10 is not designed to stand the shock stresses incident to the jarring or jerking of the flywheel. Furthermore, the parts are so arranged that it is exceedingly difficult to thread a pulling cable behind the flywheel upon which to take purchase. Furthermore, it is very awkward to rig tackle to obtain the necessary leverage to remove the flywheel when the press is in position in a plant. With our invention an overhead crane takes the weight of the flywheel through appropriate slings. The plug 74 is then removed and fitted to a source of fluid pressure which may be a small hydraulic pump operated by hand or by power if desired. Fluid under pressure is then applied through the duct 72 behind the annular piston 60. As soon as sufficient pressure is applied the piston will move to the right, forcing the outboard inner race 14 to drift to the right permitting the rollers 18 to be removed. It will be noted that the thrust is applied evenly and uniformly about the piston 60 and hence about the inner race 14, precluding any tendency to cant the race with its consequent tendency to bind. As soon as the race 14 is removed and the rollers 18 are freed, the hydraulic pressure is relieved and the cylinder 58, together with its nested piston 60, is removed to the right. At this juncture the flywheel is free to be removed to the right with a minimum of inconvenience and effort.

It will be seen that we have accomplished the objects of our invention. We have provided a flywheel bearing demounting assembly so constructed that the flywheel may be readily removed from its bearing in a simple, convenient and expeditious manner. Our flywheel bearing demounting assembly is built into the construction so that it does not require additional space and is inexpensive to construct and easy to operate. In event it becomes necessary to replace a flywheel bearing in a power press forming part of a production line the task may be done quickly so that the production line will be incapacitated for a minimum period of time, representing a distinct economic saving.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. In a bearing demounting assembly, a support, an inner race carried by the support, bearing members carried by the inner race, an outer race carried by the bearing members, a rotatable member carried by the outer race for rotation on the bearing members, a pair of telescoped members carried by the support, thrust resisting means carried by the support, one of said telescoped members adapted to contact the thrust resisting means, the other of said telescoped members adapted to contact the inner race, and means for introducing fluid under pressure between the telescoped members to extend one thereof with respect to the other whereby to move the inner race axially of said support.

2. A bearing demounting assembly as in claim 1 in which said support comprises a quill.

3. A bearing demounting assembly as in claim 1 in which said rotatable member comprises a flywheel.

4. A bearing demounting assembly as in claim 1 including in combination a second race carried by said support, said race forming part of said thrust resisting means.

5. A bearing demounting assembly as in claim 1 in which said bearing members comprise rollers.

6. A bearing demounting assembly as in claim 1 having a second inner race, said telescoped members being positioned between the first and second inner races.

7. A bearing demounting assembly as in claim 1 in which said means for introducing fluid under pressure between the telescoped members includes a duct formed in said support and means providing communication between said duct and said telescoped members.

8. A bearing demounting assembly as in claim 1 in which said telescoped members comprise an annular piston and an annular cylinder disposed about said support.

9. A bearing demounting assembly as in claim 1 in which said telescoped members comprise an annular piston and an annular cylinder disposed about said support and means for sealing the space between said cylinder and said piston.

10. A bearing demounting assembly as in claim 1 in which said telescoped members comprise an annular piston and an annular cylinder disposed about said support, means for sealing the space between said cylinder and said piston and means for sealing the space between the support and the piston.

11. A bearing demounting assembly as in claim 1 in which said telescoped members comprise an annular piston and an annular cylinder disposed about said support, means for sealing the space between said cylinder and said piston, means for sealing the space between the support and the piston and means for sealing the space between the annular cylinder and said support.

12. A power press flywheel bearing demounting assembly including in combination a quill, a pair of inner races mounted upon said quill, a pair of groups of roller bearings carried by respective inner races, a pair of outer races supported by said bearing rollers, a flywheel carried by the outer races for rotation on said bearing rollers, a spacer ring disposed between the outer races, an inner spacer ring disposed between the inner races, said inner spacer ring comprising a pair of annular telescoped members carried by the quill, one of said members forming an annular cylinder, the other of said members forming an annular piston, the annular cylinder contacting one of the inner races and the annular piston contacting the other of the inner races, said quill being formed with a bore for the introduction of fluid under pressure, means providing communication between said bore and said cylinder whereby upon the introduction of fluid under pressure into said bore said piston will be moved out of said cylinder to move one inner race axially with respect to the other.

13. A power press flywheel bearing demounting assembly as in claim 12 in which sealing means are provided between the piston and the cylinder.

14. A power press flywheel bearing demounting assembly as in claim 12 in which sealing means are provided between the cylinder and the quill.

15. A power press flywheel bearing demounting assembly as in claim 12 in which sealing means are provided between the piston and the quill.

16. A power press flywheel bearing demounting assembly as in claim 12 in which said inner races are formed with an inclined cross-sectional shape whereby they are adapted to receive thrust both at right angles to and along the axis of rotation of the flywheel.

GEORGE I. DANLY.
JAMES C. DANLY.

REFERENCES CITED

The following references are of record in the file of this patent:

UNITED STATES PATENTS

| Number | Name | Date |
| --- | --- | --- |
| 961,375 | Seabrook | June 14, 1910 |
| 1,843,463 | Tawresey | Feb. 2, 1932 |
| 2,348,293 | Hamer | May 9, 1944 |